United States Patent
Hauser et al.

(10) Patent No.: US 7,222,302 B2
(45) Date of Patent: May 22, 2007

(54) METHOD AND APPARATUS FOR GENERATING IT LEVEL EXECUTABLE SOLUTION ARTIFACTS FROM THE OPERATIONAL SPECIFICATION OF A BUSINESS

(75) Inventors: Rainer F. Hauser, Thalwil (CH); Shubir Kapoor, Mohegan Lake, NY (US); Jana Koehler, Lucerne (CH); Santhosh Kumaran, Croton-on-Hudson, NY (US); Frederick Y. Wu, Cos Cob, CT (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 10/455,658

(22) Filed: Jun. 5, 2003

(65) Prior Publication Data

US 2004/0249645 A1 Dec. 9, 2004

(51) Int. Cl.
*G06F 15/00* (2006.01)
*G06F 13/00* (2006.01)

(52) U.S. Cl. ............... 715/734; 715/737; 715/744; 709/223; 705/26

(58) Field of Classification Search ............. 715/734, 715/735, 744, 737, 736, 733; 709/223, 226; 709/201, 203; 705/1, 26
See application file for complete search history.

(56) References Cited

U.S. PATENT DOCUMENTS

| | | | |
|---|---|---|---|
| 6,804,711 B1 * | 10/2004 | Dugan et al. | 709/223 |
| 2003/0046097 A1 * | 3/2003 | LaSalle et al. | 705/1 |
| 2003/0158784 A1 * | 8/2003 | Shaver et al. | 705/26 |

* cited by examiner

Primary Examiner—Cao (Kevin) Nguyen
(74) Attorney, Agent, or Firm—Scully, Scott, Murphy & Presser, P.C.; Derek S. Jennings

(57) ABSTRACT

A system and method that implements top-down and bottom-up model-driven transformations between platform-independent (business view) modeling approaches and platform-specific (IT architectural) models. On the business level, business view models may be expressed in, but not limited to ADF or UML2, whereas on the IT architecture side, service-oriented architectures with Web service interfaces and processes are specified in business process protocol languages including, but not limited to, BPEL4WS, or workflow definitions. An architecture and a transformation method based on typed information flows automatically transforms platform-independent business models into executable information technology (IT) architecture specifications constrained by a specific IT platform, and vice versa. The models generated span the entire life cycle of a software system and ease the software production, deployment and maintenance tasks. That is, the different models generated for the same system are "linked" in a way that relevant changes in one model may be propagated to the other models to keep the model set consistent.

35 Claims, 7 Drawing Sheets common: {e,c}
private: {h,f,o,r}

METHOD AND APPARATUS FOR GENERATING IT LEVEL EXECUTABLE SOLUTION ARTIFACTS FROM THE OPERATIONAL SPECIFICATION OF A BUSINESS

BACKGROUND OF THE INVENTION

1. Field of the Invention

The present invention relates generally to the creation of on-demand business systems, and more particularly, to a novel application that provides business to information technology (IT) transformation and vice-versa.

2. Description of the Prior Art

An "on demand business" is one that integrates its business processes end-to-end across its enterprise as well as with its trading partners such that it can respond with speed and agility to changing business conditions. This requires tight integration between the operational specification of a business and its execution mechanisms.

Model-driven architectures (MDA) have been proposed by the Object Management Group (OMG) which is a consortium that produces and maintains computer industry specifications for interoperable enterprise applications. Model-driven architectures are proposed to reinforce the use of an enterprise architecture strategy and to enhance the efficiency of software development. The key to MDA lies in three factors: 1) the adoption of precise and complete semantic models to specify a system and its behavior; 2) the usage of data representation interchange standards; and 3) the separation of business or application logic from the underlying platform technology.

Perhaps the most important is the model representations. Models can be specified from different views: the business analyst's or the IT architect's view, and they can be represented at different levels of abstraction. MDA distinguishes between platform-independent (PIM) and platform-specific (PSM) models, but other models may be used to describe the different aspects of a system.

For example, on the PIM side, business process models are used to reflect a business analyst's or consultant's view of a business process. Typical representatives of these models are the ARIS tool set by IDS Scheer (as described in A. W. Scheer, F. Abolhassan, W. Jost, and M. Kirchner *Business Process Excellence—ARIS in Practice*. Springer, 2002), the ADF approach by Holosofx/IBM (as described in E. Deborin et al. *Continuous Business Process Management with HOLOSOFX BPM Suite and IBM MQSeries Workflow* IBM Redbooks, 2002.) or UML2 activity models (Unified modeling language superstructure, version 2.0. $2^{nd}$ revised submission to OMG RFP ad/00-09-02, 2003). On the PSM side, several models are employable such including *IT architectural models and IT deployment models*. An IT architectural model adopts a specific IT architectural approach. For example, a service-oriented architecture can be based on Web services (as described in E. Christensen, F. Curbera, G. Meredith, and S. Weerawarana, The web services description language WSDL http://www-4.ibm.com/software/solutions/webservices/resources.html, 2001) or an ERP architecture can be based on workflows (as described in F. Leymann and D. Roller. *Production Workflow*. Prentice Hall, 2000). Thus, the IT architectural model will comprise certain types of architecture (or platform)-specific IT solution components such as Web services or workflows, but it will still be platform-independent in the sense that it abstracts from a (vendor-) specific runtime platform. Under this point of view, IT architectural models combine aspects of PSMs and PIMs.

Besides being representative of a system, a model must be further analyzable by algorithmic methods in order to be useful. For example, the fundamental properties of the behavior of a system should be verifiable in a model, and different models of the same system should be "linked" in a way that relevant changes in one model can be propagated to the other models to keep the model set consistent.

Thus, as model-driven architectures aim at spanning the life cycle of a system from modeling and design to component construction, assembly, integration, deployment, management, monitoring and evolution, it would be highly desirable to provide system tools and algorithmic techniques that support the evolution of models and the consistency of different modeling views of the same system. Although models can evolve independently of each other and one model might represent system aspects that are irrelevant for another model, fundamental features of a system will be present in all models. It is therefore necessary to identify these fundamental features, to detect feature changes in a model and to propagate those changes automatically to the other system models.

Thus, it would be highly desirable to provide a solution based on model-driven transformations between PIM and PSM applications.

SUMMARY OF THE INVENTION

The present invention thus is directed to a system and methodology based on model-driven transformations, and particularly to a Transformation Engine (TE) that addresses the "linkage problem".

According to a first aspect of the invention, there is provided a top-down model-driven transformation approach that automatically transforms platform-independent business models into executable information technology (IT) architecture specifications constrained by a specific IT platform. The system and method comprises:

a computing device programmed for receiving a machine-readable representation of a business model, the computing device comprising:

a means for analyzing the specifications to automatically identify processes comprising discrete process steps that execute specific tasks in the process, and, information entities that are processed by the process steps; and, a means for automatically developing representations in the form of one or more graphs having nodes representing the process steps and links depicting a flow of information entities between process step tasks; and, a means for automatically synthesizing executable IT architecture components from the developed representations.

According to a second aspect of the invention, there is provided a bottom-up model-driven transformation approach that automatically transforms information technology (IT) architecture specifications constrained by a specific IT platform into a platform-independent business model view. The system and method comprises:

a computing device programmed for receiving executable IT platform components, the computing device comprising:

means for automatically developing representations in the form of one or more sub flow graphs according to one of more IT architecture specifications, a sub flow graph having nodes representing process steps and links depicting a flow of information entities between process step tasks;

means for automatically analyzing the one or more sub flow graphs and developing representations in the form of a process graph, the means automatically identifying processes comprising discrete process steps that execute specific tasks in the process, and, information entities that are processed by the process steps; and, a means for automatically generating a platform-independent business model view from the process graph.

It is understood that both top-down and bottom-up transformations prolong the life cycle of the business view model. It is no longer only actively used in the design and analysis phase, but plays an active role in the entire system life cycle by constraining the IT architecture.

Advantageously, the invention is incorporated in different business process modeling approaches and extracts structured information flows as their underlying common modeling principle. It describes top-down and bottom-up transformations between process graphs and information flow graphs. The models generated span the entire life cycle of a software system and ease the software production, deployment and maintenance tasks.

BRIEF DESCRIPTION OF THE FIGURES

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
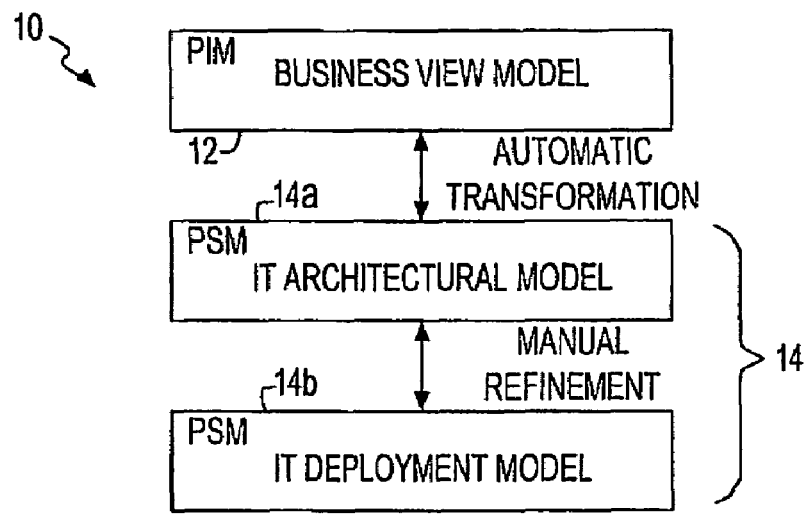
FIG. 1 illustrates model-driven transformations between PIM (e.g., business view models) and PSM applications (e.g., IT architectural or Deployment models) according to the invention.

FIG. 1 illustrates a model-driven transformation solution according to the invention and depicting conceptually the bi-directional transformation between a PIM 12 (e.g., business view models) and PSM applications 14 (e.g., IT architectural 14a or Deployment models 14b). Central to this solution is a Transformation Engine that automatically performs top-down and bottom-up model-driven transformations between PIM and PSM, wherein the top-down transformation starts from the business view model of a system or process as the PIM and derives a platform-specific IT architecture model, the PSM. This ensures that the business model determines the relevant elements of the IT architecture. It transforms the blueprint of a system as it is envisioned during a business analysis and re-engineering process into an IT architecture that will implement that blueprint. The automatic derivation of the architecture allows developers to concentrate on the refinement of the architectural model into a deployment model and to optimize this deployment. The bottom-up transformation takes a platform-specific IT architecture model as input and abstracts it into a business view model. It allows the propagation of structural changes in the IT architectural model back to the business view model and thereby supports communication from IT people to business people.

Figure 2A:
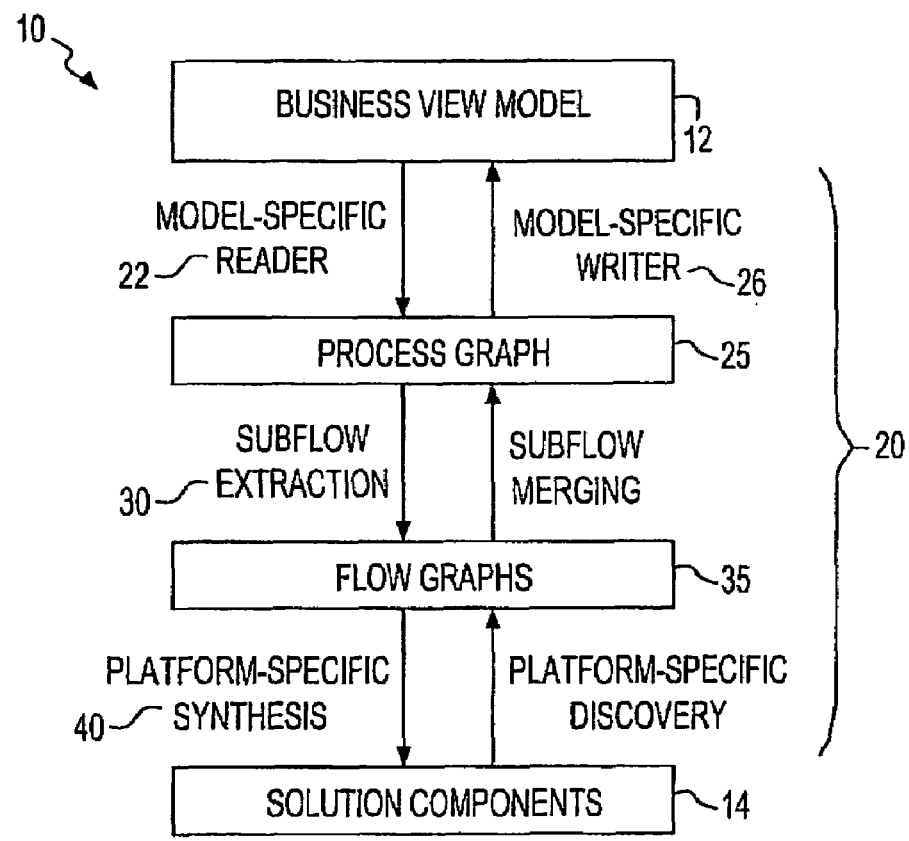
FIGS. 2(a) and 2(b) are diagrams depicting the architecture of the transformation engine according to the invention.
Figure 2B:
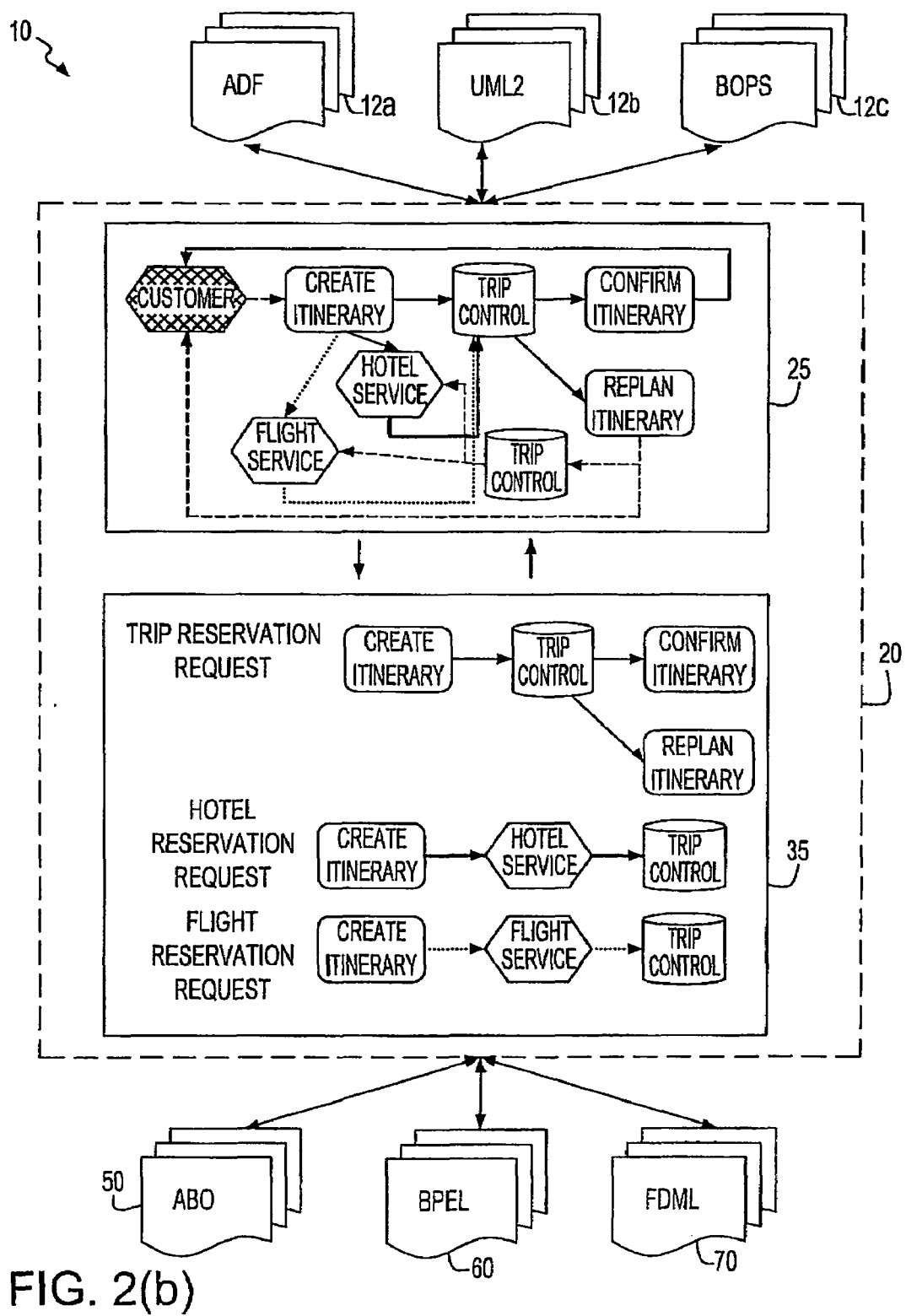

More particularly, as shown in FIG. 2(a), a transformation engine (TE) 20 transforms different business view models 12 automatically into Information Technology (IT) architectural models 14, and vice versa. As will be explained in greater detail herein, at both sides, model-independent layers have been introduced into the TE architecture 20 so as to enable handling of a variety of PIMs and PSMs, as shown in FIG. 2(b). For example, on the business view side, shown in FIG. 2(a), the TE engine 20 handles modeling approaches that structure a business process into atomic process steps and subprocesses. Atomic process steps are not further refined, whereas subprocesses can be nested within each other and lead to a hierarchical process model. The process elements (subprocesses, process steps) are linked by typed information entities that present the flow of control and physical data objects or event messages between the process elements. As shown in FIG. 2(b), representatives of these business modeling approaches include ARIS, ADF 12a, UML2 12b activity models, and Business Operational Specifications 12c (hereinafter "BOpS"), a modeling approach available by assignee International Business Machines Corp. (IBM Research). These modeling approaches all support hierarchical process models that describe processes as structured information flows across distinguishable process elements.

The transformation engine 20 particularly includes specific readers and writers for each modeling approach. When performing a top-down transformation, as shown in FIG. 2(a) indicated by downward arrow flow, a reader 22 reads in a specific business view model 12 and maps it to a so-called process graph 25, which is developed as a generalization of the information-flow models. The process graph 25 is then further analyzed to extract 30 the information type-specific subflows and then decomposed into flow graphs 35 representing these subflows. The actual transformation therefore takes place between the process graph 25 on one side and the flow graphs 35 on the other side. From the flow graphs 35, an IT architecture-specific synthesis method 40 generates solution components 14 that are required in the desired IT architectural model. In a preferred embodiment, as shown in FIG. 2, adaptive business objects (ABOs) 50, which describe persistent abstract business documents (referred to interchangeably herein as ADocs) whose life cycle is controlled by an associated state machine, business protocols between Web services specified as BPEL4WS processes 60, or workflows represented in Flow Definition Markup Language (FDML) 70 are generated.

When performing bottom-up transformations, as shown in FIG. 2(a) indicated by upward arrow flow, the TE 20 is provided with an IT architectural model comprising a set of solution components 14 from which it synthesizes the flow graphs 35 that are merged into a single process graph 25. This process graph can then be mapped to a specific business view model 12 using a model-specific writer 26.

UML2 Activity and ADF Model Approaches

Figure 3:
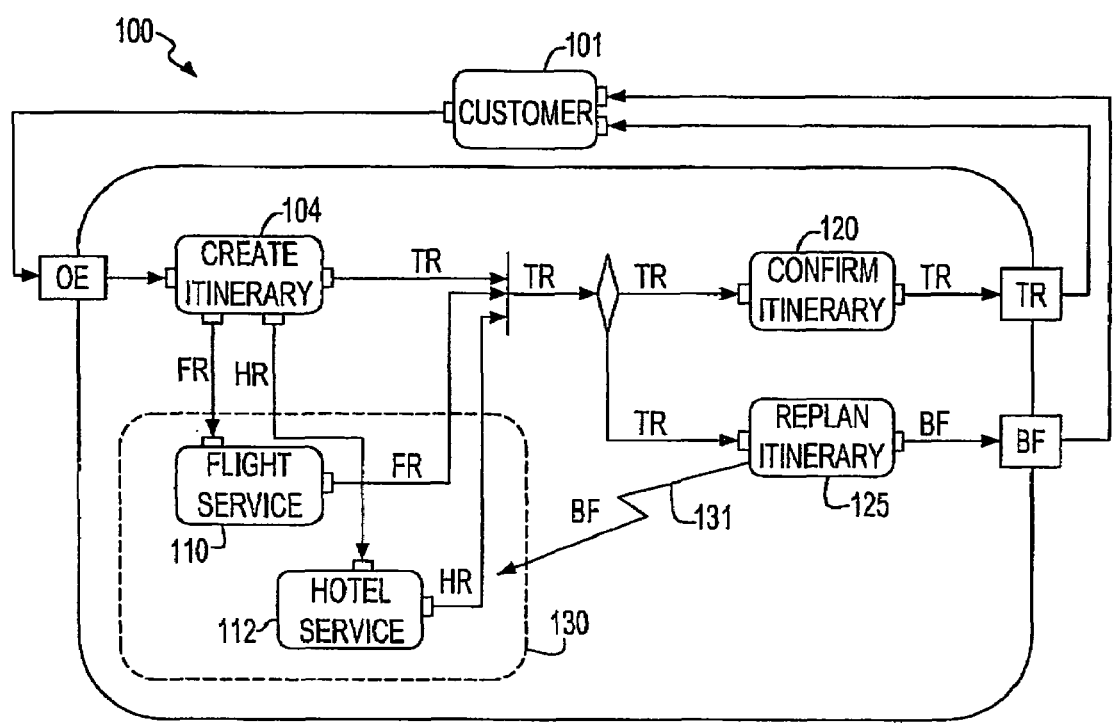
FIG. 3 is an example UML2 representation of a travel agency example.
Figure 4:
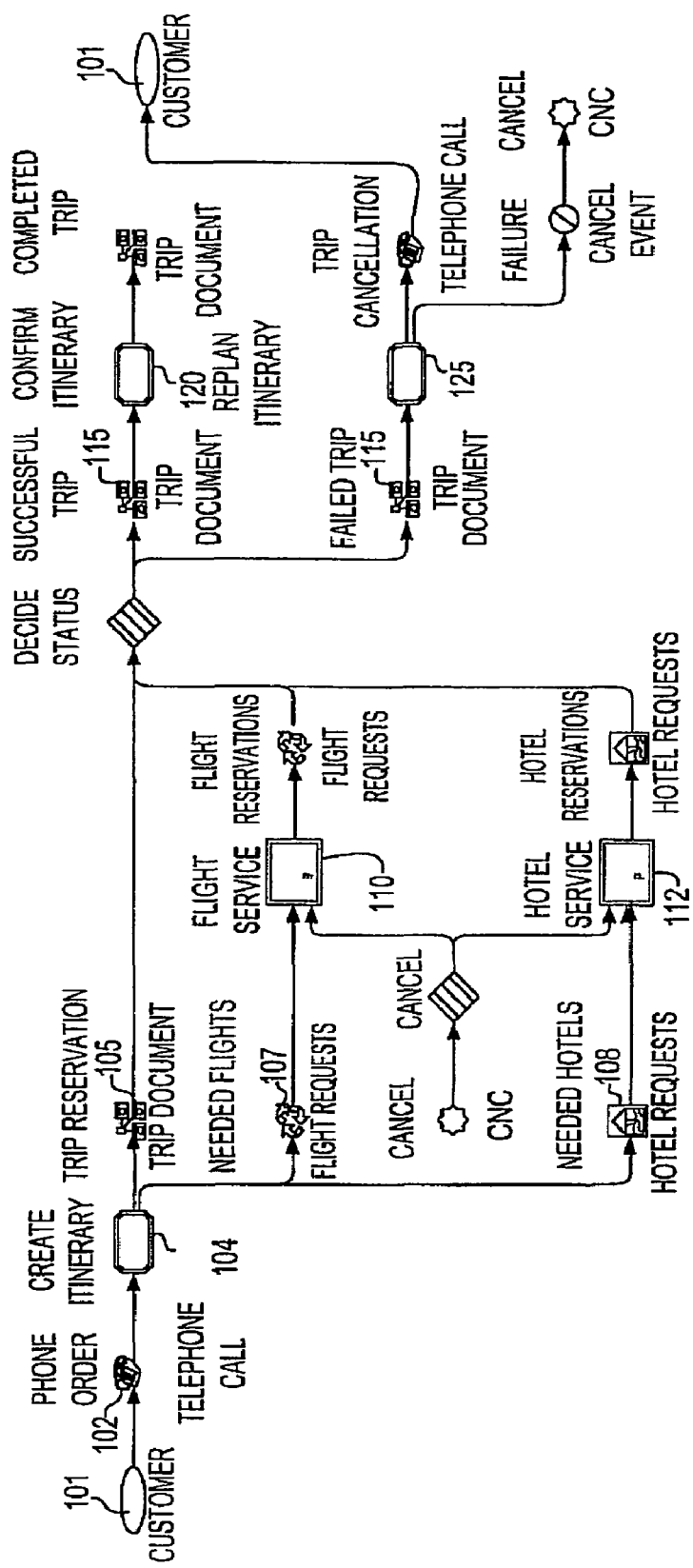
FIG. 4 is an example ADF representation of the travel agency example of FIG. 3.

The generalization of business view models to process graphs is now provided by way of an example, namely a trip-handling process of a travel agency. FIGS. 3 and 4 show respective UML2 activity model and an ADF model of this example process. As indicated in FIGS. 3 and 4, a travel agency 100 receives trip requests from customers 101, e.g., over a telephone 102. The requests are recorded in trip documents 105, from which several flight requests 107 and hotel requests 108 are derived by an agent 104. The flight and hotel requests are handled by specialized services 110, 112 respectively, that receive these requests from the travel agency. The services report their success or failure in booking the requests back to the travel agency. If all requests were successfully handled, the agency puts together the trip documents 115 for the customer 101 and confirms the travel itinerary 120. If one of the services fails to make a requested reservation, the agency immediately informs the other service to put all reservation requests on hold and contacts the customer 101 to revise the trip itinerary 125. In the models of FIGS. 3 and 4, various process steps (create itinerary, confirm itinerary, re-plan itinerary), information items (order event (OE), trip re-quest (TR), flight request (FR), hotel request (HR), booking failure (BF)) and decision/choice points are recorded.

The UML2 and ADF modeling approaches of respective FIGS. 3 and 4 have several features in common. First, they structure a process into different process elements including: 1) subprocesses, which can optionally be further refined and which are either internal or external given the current view of the process; 2) atomic process steps that actively produce, or receive and modify one or more information entities; and 3) control steps that inspect and merge information entities and then modify the control logic of a process depending on the information content. Second, both models capture the flow of information entities, which can be object documents of a particular type, events, or any other messages. Arbitrary types of information entities may be defined by a modeler and then used to annotate links between the process elements.

Table 1 summarizes the specific elements from each modeling approach and how they fit into the categorization as subprocesses, process steps, control steps, and information entities.

TABLE 1

Categorization of modeling elements in ADF and UML2

|  | ADF (FIG. 4) | UML2 (FIG. 3) |
|---|---|---|
| subprocess | process | activity |
|  | external task |  |
|  | external entity |  |
| process step | task | action |
| control step | decision | decision, merge |
|  | choice | fork, join |
| information entity | Phi | token |
| flow | connector | link |
|  | stop | initial marker |
|  | goto | final marker |

While the graphical models of FIGS. 3 and 4 are informative, the dynamic behavior of the process depicted may be subject to different interpretations as many details of the process behavior are either not visible in the model representation or, contained in natural language descriptions that are not accessible to an automatic analysis tool. The only unambiguous information that the models provide is the specification of the static flow of typed information entities between process elements. Any dynamic behavior might be sketched in the model, for example the interruptible region 130 identified in the UML2 model of FIG. 3, but no truly formal semantics underlies the model specifications, which would enable a tool or a user to derive an unambiguous interpretation.

According to the invention, the process graph representation possesses formal, state-based operational semantics that enables the representation of structured information flows in an unambiguous way. Particularly, the process graph 25 (FIG. 2(*a*)) is a formal model that represents structured information flows and only depicts the structure of the process and the principal information flow between process elements, i.e., it is an abstract process model that does not allow the study of the dynamic behavior of the process.

Figure 5:
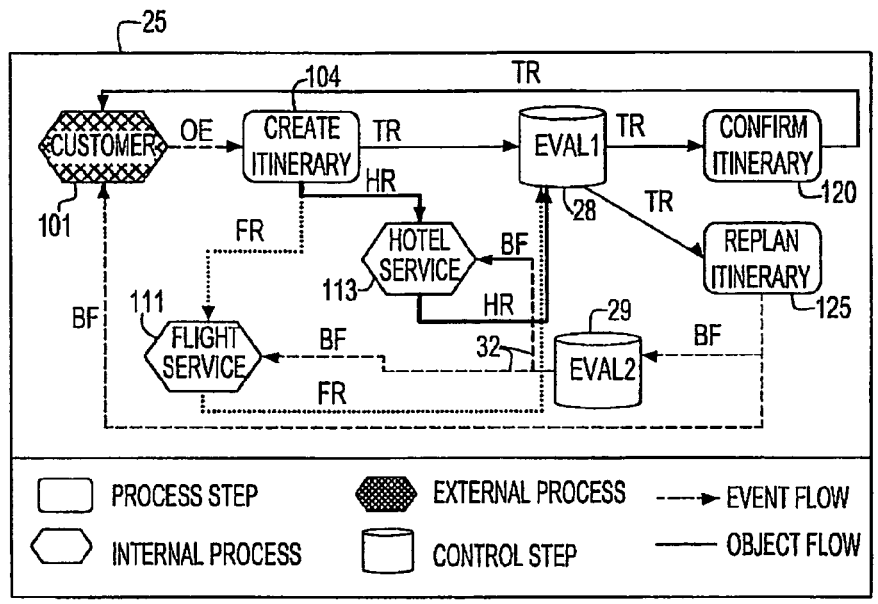
FIG. 5 is a process graph view of the example travel agency scenario depicted in FIGS. 3 and 4.

FIG. 5 illustrates the process graph view 25 that is generated from the UML2 and ADF models provided in the trip-handling examples of FIGS. 3 and 4. For each modeling approach, a specific reader, e.g., a Java or XML parser or like software tool, analyzes the model description and extracts model elements that may be mapped to the process graph elements following the basic mapping principles shown in Table 1.

In FIG. 5, repository symbols 28, 29 are used to depict control steps in order to emphasize that control steps inspect the state of objects, but do not change them (in contrast to the other process elements). In FIG. 5, the interruptible region 130 in the UML2 activity model and the lightning arrow 131 from the replan itinerary process step 125 into this region (shown in FIG. 3) are mapped to a new subgraph including an event link from this process step to a new control step 29 (labeled EVAL2), from which event links 32 lead to all process steps or sub-processes in the region, e.g., Internal process steps 111, 113. If a model establishes a link between two process steps without assigning to it any information item, which is usually known as a control link, then a new event constant is generated and the control link is mapped to an event link in the process graph. This guarantees that the ordering between two activities that are linked with the control link is preserved in the process graph via the event link.

Note that a process graph is flat if it has no hierarchical structure. If a business view model includes a hierarchical process model where a subprocess at a higher level is refined with a separate process model at a lower level, then the subprocess vertex in the process graph may be replaced by the process graph obtained from the lower-level process model if desired. It is up to a modeler to decide whether subprocesses should be kept as abstract process steps or refined into their subprocesses. The replacement only succeeds if the signature of the subprocess vertex is identical to the signature of the subprocess graph, which is the declaration of incoming and outgoing information entities for the subprocess.

Figure 6:
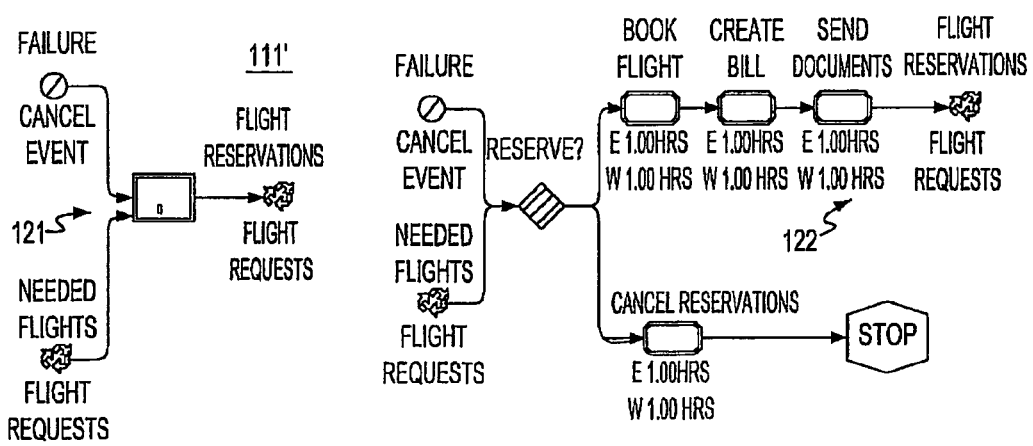
FIG. 6 shows the Flight Service internal sub-process and its refinement in a separate ADF process model.

FIG. 6 depicts the Flight Service internal sub-process 111 and its refinement in a separate ADF process model 111'. The Phi types of the ingoing and outgoing links 121,122 respectively of the ADF process node 110 and the ADF subprocess model 111' must be the same. The model-specific readers follow very closely the informal semantics as it is described in the modeling guidelines of the various approaches. The example process graph 25 for the trip handling process 100 may be obtained in this way if the modelers provide precise information about the types of information entities that flow between the process elements in each model. In the UML2 model (FIG. 3) this requires that token types be identified that flow along the links, whereas in the ADF model (FIG. 4), different types of Phis have to be defined and related to either an event category, an object category, or other categories.

Some business process models may also annotate process steps with additional information who can execute the process step. In an ADF model, this can for example be done by adding so-called roles to a task. The information about roles may also specify whether a process step is done automatically (i.e. it is executed by a machine) or whether it requires a collaboration with a human user. It is assumed, for instance, that the business view models of the trip-handling example associate human roles with the process steps "Create Itinerary", "Confirm Itinerary", and "Replan Itinerary". This information is not visible in the graphical depiction of the process graph as shown in FIG. 5, but is available in the machine-generated representation of this graph.

Discovery of Platform-Specific Elements in a Process Graph

After the process graph 25 (FIG. 5) has been constructed, the transformation engine runs a discovery phase to extract various subgraphs from the process graph that provide information to synthesize components for the platform-specific model. It should be understood that even with very little information only sketching the static information flow, useful IT architectural components may still be derived.

As will be described in greater detail herein, the transformation engine 20 implements, but is not limited to six (6) discovery steps: 1) Business Objects; 2) stateful, adaptive business objects also called Adaptive Documents (ADocs); 3) Macroflows; 4) Collaborations; 5) Screenflows; and 6) Adapters; and, two (2) synthesis steps: 7) BPEL4WS specifications, and 8) ADoc State machines. Each discovery step works on the internal process graph representation and establishes an element in the IT model.

To discover Business Objects, the TE investigates the information flow in the process graph. Each information entity that has been declared as belonging to the object category is mapped to a Business Object in the PSM.

In the trip-handling process, the following Business Objects are discovered:
 trip request
 hotel request
 flight request To discover ADocs, the information flow of the discovered Business Objects is inspected further. Each Business Object that flows through at least two atomic process steps in the process graph is mapped to an ADoc in the PSM.

In the trip-handling process, this criterion applies to all three Business Objects, i.e. they all become ADocs in the PSM:
 trip request
 hotel request
 flight request For each ADoc, an ADoc state-machine will be synthesized as will be described in greater detail hereinbelow.

Figure 7:
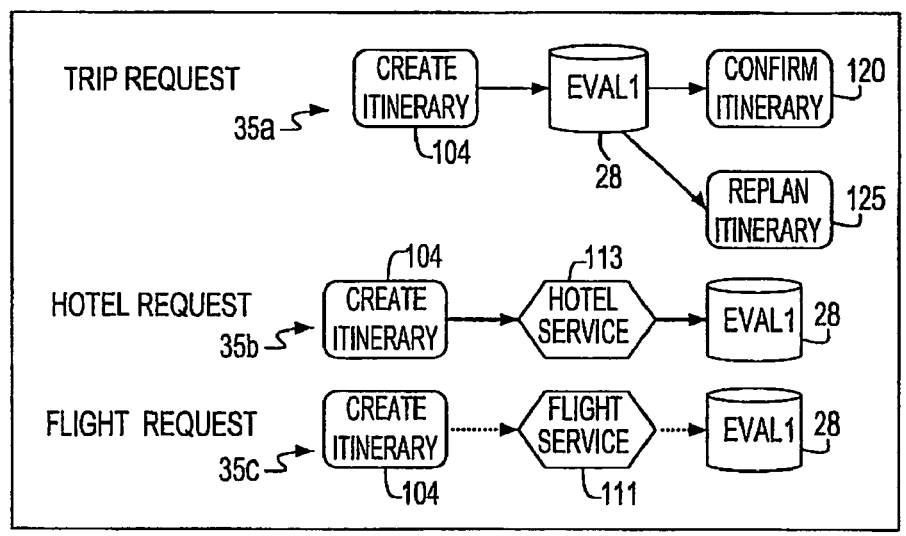
FIG. 7 illustrates the individual sub-flows 35a–35c for the respective three object types (trip request, hotel request, flight request) that are discovered in the travel agency (trip handling) example of FIGS. 3 and 4.

The discovery of Macroflows tracks the information flow of each of the ADocs and extracts the sub-graphs specifying the flow of one ADoc. The sub-graphs 35a, 35b, 35c, for the respective three object types (trip request, hotel request, flight request) for the trip-handling example are shown in FIG. 7. The Macroflows will later be mapped to one or several BPEL4WS specifications.

Collaborations are discovered from the role information that was associated with the process steps in the business view model. If a process step is annotated with a role that can only be performed by a human, a collaboration is derived. In the trip-handling example, the process steps
 "Create Itinerary",
 "Confirm Itinerary", and
 "Replan Itinerary"

have been marked with human roles.

The discovery of Screenflows is based on the discovery of collaborations and the information flow in the process graph. For each collaboration, a screen must be generated that allows a human to execute his/her role in the computerized business process. The information that has to be displayed on the screen, is derived from the information flow that is coming into a process step and leaving this process step in the process graph. The order of appearance of the screens is determined by the ordering of the process steps in the process graph that have been mapped to collaborations. In the trip-handling example, it is discovered that three screens have to be added to the PSM:
 a "Create Itinerary" screen that displays the order event, trip request, flight requests, and hotel requests.
 A "Confirm Itinerary" screen that displays the updated trip request.
 A "Replan Itinerary" screen that displays the updated trip request and the booking failure information.

The ordering of these screens follows the ordering of the process steps in the process graph. First the "Create Itinerary" screen must be displayed, then followed by either the "Confirm Itinerary" screen or the "Replan Itinerary" screen.

Figure 8:
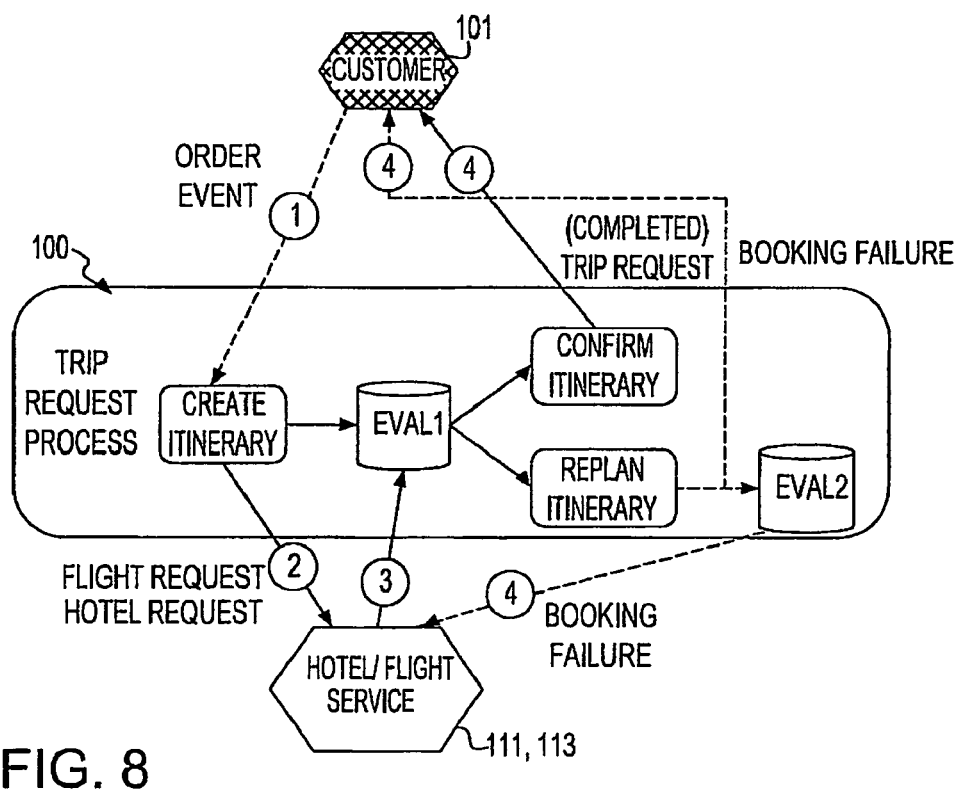
FIG. 8 illustrates the internal and external process boundaries of the process steps that constitute the trip request handling process.

Adapters are generated between atomic process steps and external or internal subprocesses. They are used to map information items that cross the process boundaries as shown in FIG. 8 for the trip-handling example. FIG. 8 is a view 150 depicting the internal and external process boundaries of the process steps that constitute the trip-handling process, and particularly illustrates process boundaries and message interactions between the trip-handling process 100 and its internal 111, 113 and external 101 partners. In the trip-handling example, the following adapters are established as components in the IT architectural model:
 Customer to Create Itinerary-Adapter
 Confirm Itinerary to Customer-Adapter
 Replan Itinerary to Customer-Adapter
 Evaluate2 to Hotel or Flight Service-Adapter
 Create Itinerary to Hotel and FlightService-Adapter During the bottom-up transformation where the TE is provided with the subflow graphs, which were derived from the PSM components, these subflow graphs are composed into one process graph by merging identical vertices. However, it must be ensured that identical process elements in different subflow models have identical names or else a mapping between vertices must be provided. In many instances, the subgraphs shown in FIGS. 7 and 8 will allow the process graph from FIG. 5 to be completely restored. For instance, the example top-down subflow extraction process 30 (FIG. 2(a)) may not preserve event links between process steps in the subflows. In the trip handling example, this does not matter, because the original process does not contain event links between process steps. In other examples, it may cause a loss of information. Which subflows are of interest to the TE depends on the models used on both sides—the PSM side and the PIM side.

IT Architectural Models and the Automatic Synthesis of Solution Components

The following demonstrates how the Macroflow and ADoc solution components of an IT architecture are synthesized by the platform-specific synthesis methods. For exemplary purposes, one target IT architecture is based on Web services, i.e., self-contained, modular units of application logic which provide business functionality to other applications via an Internet connection. A Web service is specified by defining messages that provide an abstract definition of the data being transmitted and operations that a Web service provides to transmit the messages. Operations are grouped into port types, which describe abstract end points of a Web service such as a logical address under which an operation can be invoked. Concrete protocol bindings and physical address port specifications complete a Web service specification.

Web services support the interaction of business partners and their processes by providing a stateless model of "atomic" synchronous or asynchronous message exchanges. These "atomic" message exchanges may be composed into longer business interactions by providing message exchange protocols that show the mutually visible message exchange behavior of each of the partners involved. An example of such a protocol specification language is BPEL4WS such as described in the reference authored by F. Curbera et al. and entitled, "Business process execution language for web services" www-106ibm.com/developerworks/webservices/library/ws-bpel/, 2002, the contents and disclosure of which is incorporated by reference as if fully set forth herein. According to the invention, the basic elements of a BPEM4WS protocol specification are derived from the process graph and the subflows it comprises.

Synthesis of BPEL4ws Protocol Specifications

As shown in FIGS. 3 and 4, in the travel agency (trip handling) example, three object processing sub-flows have been identified that link four communicating partners: (1) the travel agent 104 who handles the trip request processing, (2) the customer 101 who is an external partner to the travel agent, (3) the flight service 111 which is an internal partner, i.e., a subprocess that has not been further specified, and (4) the hotel service 113 which is also an internal partner dealing with the hotel request processing. Each partner needs to specify how it wants to exchange messages, and these protocols need to match each other.

FIG. 8 summarizes the message interaction information of this process with its partners as may be automatically extracted from the process graph 25 (FIG. 5). Besides the types of messages, (incomplete) information about the order in which the messages are sent may be derived as indicated with the circled numbers.

As will be described in greater detail herein, the synthesis of a BPEL4WS skeleton is generated in XML and the declaration of the partners that are derived from the external and internal process steps in the process graph are first performed. It is understood that other model types may be generated, e.g., UML. In this example, it is assumed that the interaction with the customer will also proceed via a Web service interface.

```
<process name="TripHandling">
  <partners>
    <partner name="Customer"
      myRole="TripHandlingAgent"
      serviceLinkType="CustomerServiceLink"
      partnerRole="CustomerAgent"/>
    <partner name="FlightService"
      myRole="TripHandlingAgent"
      serviceLinkType="FlightServiceLink"
      partnerRole="FlightServiceAgent"/>
    <Partner name="HotelService"
      myRole="tripHandlingAgent"
      serviceLinkType="HotelServiceLink"
      partnerRole="HotelServiceAgent"/>
  </partners>
  <containers>
    . . .
  <containers>
    . . .
</process>
```

The name of the process is derived from the name of the business view model. The names of the partners are mechanically derived from the external and internal subprocess names. The partner role names are composed of the partner names with the suffix Agent added, whereas the value of the attribute myRole is again the model name plus the Agent suffix. The default values for the service link types are also mechanically derived from the partner names.

For each information entity discovered in the business view model 12 and that occurs in the signature of at least one process step in the trip-handling process, message names OrderEvent, TripRequest, FlightRequest, HotelRequest and BookingFailure and corresponding container names are defined, as shown in FIG. 8 and described herein below:

```
<containers>
  <container name="OrderEvent"
    messageType="OrderEventType"/>
  <container name="TripRequest"
    messageType="TripRequestType"/>
  <container name="FlightRequest"
    messageType="FlightRequestType"/>
  <container name="HotelRequest"
    messageType="HotelRequestType"/>
  <container name="BookingFailure"
    messageType="BookingFailureType"/>
</containers>
```

According to the invention, the control flow of the message exchange between the process and its partners may be derived as the process graph 25 provides the basic information needed to specify the choreography of message exchanges between the partners. The edges define a partial ordering between the process steps that map to corresponding <sequence> and <flow> constructs. Ordered steps are arranged within a sequence, whereas unordered steps are arranged within a flow construct. Control steps are mapped to <switch> activities and introduce the required branching in the message exchange protocol.

Figure 9:
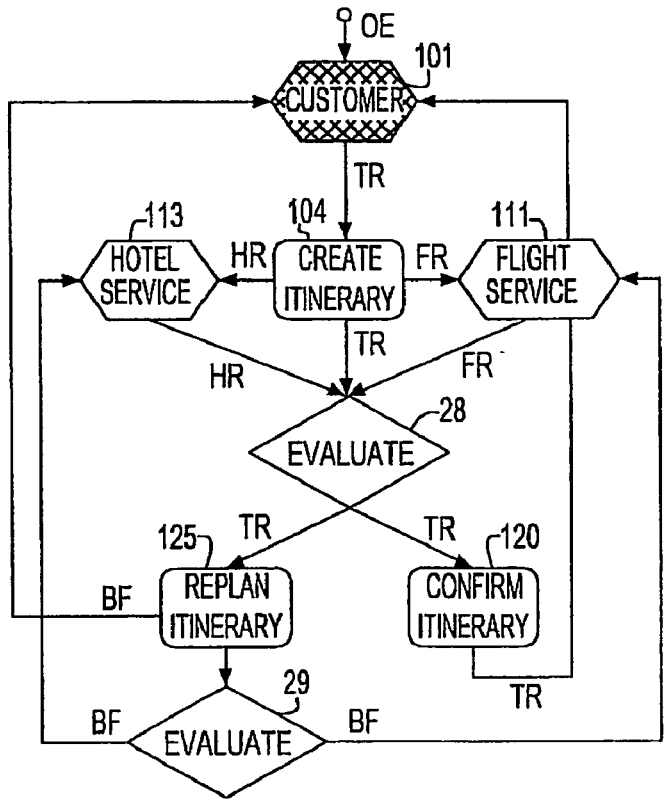
FIG. 9 illustrates the message control flow of the example travel agency trip handling process.

FIG. 9 illustrates the message control flow 200 of the example travel agency trip handling process. Basically, the flow graph 200 of FIG. 9 summarizes the message flow control structure from the business graph and shows how it maps to structured and atomic BPEL4WS activities. In FIG. 9, solid lines show message exchanges with partners, and dotted lines show message exchanges between internal process steps, which are not modeled in the BPEL4WS file. The control flow for the example trip handling message exchange process depicted in FIG. 9 is provided as follows:

```
<sequence>
  createItinerary
  Evaluate
  <switch>
  ConfirmItinerary
```

```
<otherwise>
  <sequence>
    ReplanItinerary
    Evaluate
    <switch>
      Hotel Service
      <otherwise>
        FlightService
      </otherwise>
    </switch>
  </sequence>
</otherwise>
</switch>
</sequence>
```

The mnemonic step names have to be replaced with the message interactions a step has with a partner. Each directed link that links a step vertex with a partner vertex is mapped to a basic BPEL4WS activity. A directed edge from a partner vertex to a step vertex is interpreted as a message flow from a partner to the process. It is therefore mapped to a <receive> activity. A directed edge into the other direction, i.e. from a step vertex to a partner vertex is mapped to an <invoke> activity.

With respect to BPEL4WS synthesis, the process starts when it receives an order event message from the customer. By default, a new process instance is always instantiated. After the message has been received, a trip request object is created, and hotel and flight request messages are sent in any order to the two partner services. Port type names are simple default strings and operation names are derived from the (abbreviated) names of the interacting process elements. For example, "Customer to Create Itinerary" is abbreviated with CToCI, "Create Itinerary to Flight Service" is abbreviated with CIToFS, the control steps are abbreviated with EVAL. The container names correspond to the message names that are exchanged.

```
<sequence>
    <receive partner="Customer"
        portType="pt1"
        operation="CToCI"
        createInstance="yes"
        container="OrderEvent">
    </receive>
<flow>
    <invoke partner="HotelService"
        portType="pt2"
        operation="CIToHS"
        inputContainer="HotelRequest">
    </invoke>
    <invoke partner="FlightService"
        portType="pt3"
        operation="CIToFS"
        inputContainer="FlightRequest">
    </invoke>
</flow>
```

After the partner services have been invoked, the process waits for the services to send the results of their booking operations, which again may arrive in any order.

```
<flow>
    <receive partner="HotelService"
        portType="pt4"
        operation="HSToEVAL1"
        container="HotelRequest.">
    </receive>
    <receive partner="FlightService"
        portType="pt5"
        operation="FSToEVAL1"
        container="FlightRequest">
    </receive>
</flow>
```

After the answers have been received, the process has to branch depending on whether the services were able to book the requests or not. This introduces a first <switch> construct in the process. No condition for the switching can be derived from the process model and therefore a default placeholder is inserted. In the first branch (Confirm Itinerary to Customer), the process needs to inform the customer about the successful completion of his reservation and send the completed trip request documents. In the second branch (Replan Itinerary to Customer, Evaluate to Hotel Service or Flight Service), it needs to inform the customer about the booking failure and decide which of the services has to be informed about the failure of the other partner. The partners can be informed in any order, which again introduces a <flow> construct into the process. Within the flow, another <switch> construct is nested that decides which partner is informed.

```
<switch>
    <case condition = "condition1">
        <invoke partner = "Customer"
            portType = "pt6"
            operation = "ConIToC"
            inputContainer = "TripRequest">
        </invoke>
    </case>
    <otherwise>
        <sequence>
            <invoke partner = "Customer"
                portType = "pt7"
                operation = "RIToC"
                inputContainer = "BookingFailure">
            </invoke>
            <switch>
                <case condition = "condition2">
                    <invoke partner = "HotelService"
                        portType = "pt8"
                        operation = "EVAL2ToHS"
                        inputContainer = "BookingFailure">
                    </invoke>
                </case>
                <otherwise>
                    <invoke partner = "FlightService"
                        portType = "pt9"
                        operation = "EVAL2ToFS"
                        inputContainer = "BookingFailure">
                    </invoke>
                </otherwise>
            </switch>
        </sequence>
    </otherwise>
</switch>
</sequence>
</process>
```

By default, it is assumed that all message exchanges are asynchronous. The BPEL4WS specification becomes rather complicated due to the two control steps included within the process. Obviously, these could be merged into a single <switch> construct with three different cases by applying BPEL4WS optimization techniques similar to the ones presented in the reference authored by N. Sato, S. Saito, and K. Mitsui entitled "Optimizing composite webservices through parallelization of service invocations" In EDOC-03 [5], pages 305–316, incorporated by reference as if fully set forth herein. The transformation engine of the invention may then propagate this simplification back to the business view model where it could be discussed with the process designers.

The Business Objects, Collaborations, Adapters, and Screen Flows discovered as part of the transformation and discussed hereinabove are further refined and integrated with the BPEL4WS as part of the manual refinement from IT Architecture Model to IT Deployment model shown in FIG. 1. The integration of these components with BPEL4WS is described in greater detail herein. Business Objects map to the message types discussed in the containers section of the BPEL4WS definition. Collaborations, also known as microflows, map to the Web service operations that are invoked from BPEL4WS and invoke activities that are performed internal to the business process. Adapters map to BPEL4WS and invoke activities that are performed external to the business process. Screen flows map to BPEL4WS and receive activities in which the activity is pending for human input to the business process. Further details on business objects, collaborations, adapters, and screenflows may be found in the reference authored by Simon Cheng, Mathews Thomas, Santhosh Kumaran, Amaresh Rajasekharan, Frederick Wu, Yiming and Ye, Ying Huang, entitled "A Model-Driven Approach for Item Synchronization and UCCnet Integration in Large E-commerce Enterprise Systems", in Proceedings of the Fifth International Conference on Enterprise Information Systems, published by ESEO, Angers, France in April 2003, the whole contents and disclosure of which is incorporated by reference as if fully set forth herein.

Synthesis of State Machines

Another programming model that is supported with the synthesis method are stateful business objects. So called adaptive documents (ADocs) as described in the reference authored by P. Nandi, S. Kumaran, T. Heath, K. Bhaskaran, and R. Dias entitled "ADoc-oriented programming" In *Proceedings of the International Symposium on Applications and the Internet (SAINT-*2003) IEEE Press, 2003, incorporated by reference as if fully set forth herein, and also referred to as adaptive business objects (ABO), which are persistent data objects that carry their own processing instructions in the form of an associated (possibly non-deterministic) finite-state machine. When in a particular state, an ABO can invoke an activity and, depending on the result of the activity execution, it will transit to one of the possible successor states. The task of the synthesis process is to generate state machine specifications for each of the discovered business objects.

In the travel agency example described, three different adaptive business objects are discovered, namely: the trip request, the flight request, and the hotel request. Each of them is processed by different activities reflected in the subprocesses and process steps of the process graph. This information is used to determine the state machine of the objects.

Considering the flow graph of each object as a means of defining the words of a formal language $L_o$, the names of the vertices are the symbols of the language, and the edges define the allowed concatenation of the symbols to obtain a word in the language $L_o$. To simplify the notation, the activity names are abbreviated with single letters: create itinerary (c), evaluate (e), hotel service (h), flight service (f), replan itinerary (r), and confirm itinerary (o). The flow graph for the trip request object defines the words ce(o|r). For the hotel request object "c h e" is obtained and for the flight request object "c f e" is obtained. Three finite state machines may now be constructed that accept these words.

The construction process defines a transition for each graph vertex and annotates it with the name of the vertex to indicate the activity that has to be invoked. For each transition, a start and an end state are defined. When a process step "A" is directly followed by a process step "B" in the graph, the end state of "A" becomes the start state of "B". This way, the state machines are built until the end state of the last process step is marked as a final state of the machine or until a process step is revisited if the process graph is cyclic. In the latter case, a cyclic state machine is obtained and it can happen that a state machine without end states is constructed. In such a case, a warning is issued as this would mean that the adaptive business object is processed in an infinite loop that never terminates. Process steps, which are unordered with respect to each other, introduce multiple successor states and lead to non-deterministic state machines. There must at least be one edge whose start state is not the end state of another edge, i.e., there must be one clearly identifiable first activity in the process graph. This state is marked as the initial state of the state machine, otherwise the construction fails.

Figure 10:
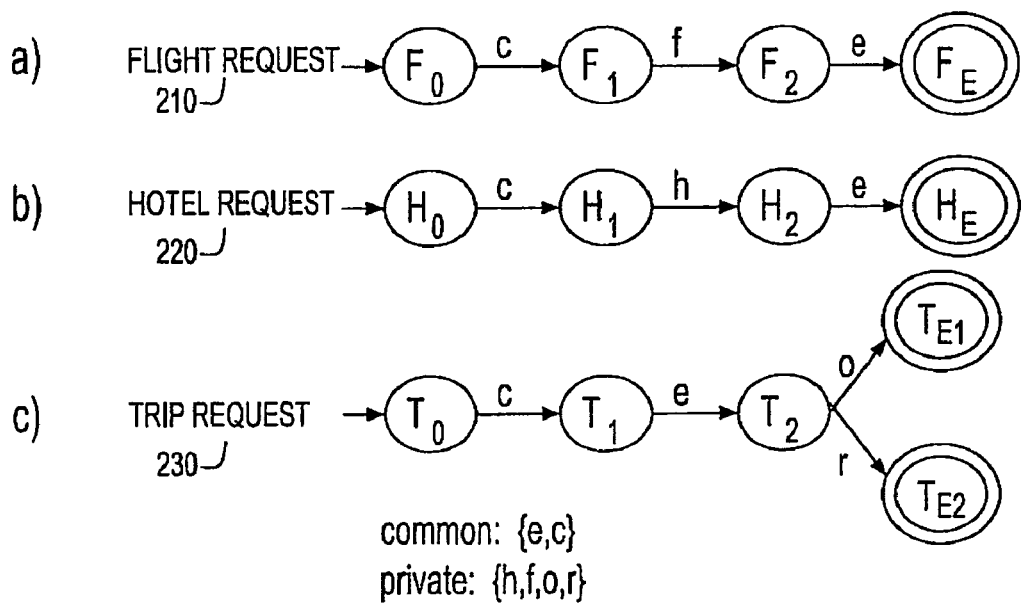
FIGS. 10(a)–10(c) illustrate the respective three state machines for the discovered business objects of the travel agency example.

FIGS. 10(a)–10(c) illustrate the result of the construction for the discovered business objects of the travel agency example, and particularly illustrate the respective three state machines 210, 220, 230 for these business objects. As shown, the state machines have the common symbols "e" and "c", but each machine also has private symbols that the others do not read.

In the ADoc-oriented programming model, the IT deployment model is created by manual refinement of Business Objects, Collaborations, Adapters, and Screen Flows and integration of these with the ADocs as discussed herein. Business Objects map to the data in the events received and processed by the ADocs. They could also appear as arguments in the activity invocations executed by the ADoc as part of state transitions. Collaborations and adapters are triggered via the activity invocations executed by the ADoc as part of state transitions. Screen flows generate a subset of the events processed by the ADocs. More details on this can be found in the above-mentioned "ADoc-oriented programming" reference incorporated as wholly set forth herein.

It should be understood that the business view models and platform-specific IT solution components may be accessed by humans for further inspection or have been created by them as input to the transformation engine. The process graph and flow graphs may not be externally visible, but are merely thought as internal representations of the fully automatic transformation engine. This means, when transforming from one external representation into the other (business view models into solution components or vice versa) no human interaction is required, but only the result is shown. A human input may only be needed to determine, which output is described from the set of available synthesis methods and writers.

Further, the transformation engine is additionally able to support dynamic model reconciliation. For example, after a given business view model has been transformed into an IT solution component, the generated component can be further refined and/or modified by a human. By transforming the modified component back into a new business view model and comparing the original business view model with the result of the back-transformation, the transformation engine can automatically detect deviations between both models and report them to a user.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

The invention claimed is:

1. A system for automatically transforming platform-independent business models into executable information technology (IT) architecture specifications constrained by a specific IT platform, said system comprising:
a computing device programmed for receiving a machine-readable representation of a business model, said computing device comprising:
a means for analyzing said specifications to automatically identify processes comprising discrete process steps that execute specific tasks in the process, and, information entities that are processed by the process steps; and,
a means for automatically developing representations in the form of one or more graphs having nodes representing said process steps and links depicting a flow of information entities between process step tasks; and,
a means for automatically synthesizing executable IT architecture components from said developed representations.

2. The system as claimed in claim 1, wherein a developed representation includes a process graph depicting a generalization of the business view model, said analyzing means comprising a model-specific reader associated with a specific business model approach for automatically parsing a representation of said business model and extracting model elements that can be mapped to process graph elements.

3. The system as claimed in claim 1, wherein said information entities comprise one or more of objects, events and messages, said process graph elements comprising one or more selected from a group comprising: atomic process steps for producing, receiving or modifying one or more information entities; internal or external sub-process steps in accordance with a business process view; control steps that inspect information entities and modify control logic of a process depending upon information content; and information entity flow, including the flow of control or objects or event messages between said process tasks.

4. The system as claimed in claim 2, wherein said process graph is hierarchical structure including high-level and lower-level subprocesses.

5. The system as claimed in claim 2, further comprising subflow extraction means for analyzing said process graph and extracting subflows, wherein a developed representation includes one or more subflow graphs, said subflow graphs capable of being mapped to specific IT platform solution components according to a platform specific synthesis method.

6. The system as claimed in claim 5, wherein an extracted subflow graph specifies the flow of an information entity of object category between process steps and internal or external subprocesses.

7. The system as claimed in claim 6, wherein an extracted subflow graph specifies the process boundaries between a process step and its internal and external partners and message interaction therebetween.

8. The system as claimed in claim 5, wherein said analyzing means implements means for discovering whether a business object defined in said business model representation flows between process steps in said process graph and defining said object as an adaptive business document (ADoc).

9. The system as claimed in claim 8, wherein said analyzing means implements means for discovering business objects explicitly defined as information entities in said business model representation.

10. The system as claimed in claim 9, wherein for each ADoc discovered, said analyzing means generating a macroflow comprising a set of tasks based upon macroflow links derived from the physical transfer of ADocs between tasks as shown in the information flow between process steps in the business model representation.

11. The system as claimed in claim 10, wherein said analyzing means implements means for identifying process steps as being collaborations requiring interaction with a human by analyzing role information contained in a business process model.

12. The system as claimed in claim 11, wherein said analyzing means implements means for generating screenflows from process steps that have been determined as collaborations and listing the information entities shown by such screenflows derived from the information flows represented in the business process model.

13. The system as claimed in claim 11, wherein said analyzing means implements means for establishing an adapter for process steps that interact with external or internal subprocesses represented in the business process model.

14. The system as claimed in claim 10, further comprising means for mapping each macroflow generated to a BPEL4WS specification.

15. A method for automatically transforming platform-independent business models into executable information technology (IT) architecture specifications constrained by a specific IT platform, said method comprising the steps of:
a) providing a computing device programmed for receiving a machine-readable representation of a business model;
b) analyzing said specifications to automatically identify processes comprising discrete process steps that execute specific tasks in the process, and, information entities that are processed by the process steps; and,
c) automatically developing representations in the form of one or more graphs having nodes representing said process steps and links depicting a flow of information entities between process step tasks, and,
d) automatically synthesizing executable IT architecture components from said developed representations.

16. The method as claimed in claim 15, wherein a developed representation includes a process graph depicting a generalization of the business view model, said analyzing step comprising the step of automatically parsing a representation of said business model and extracting model elements that can be mapped to process graph elements.

17. The method as claimed in claim 16, further comprising subflow extraction step for analyzing said process graph and extracting subflows, wherein a developed representation includes one or more subflow graphs capable of being mapped to specific IT platform solution components according to a platform specific synthesis method.

18. The method as claimed in claim 17, wherein said analyzing step further includes the step of discovering the flow of an information entity between process steps and internal or external subprocesses in a business process model and representing this flow as an extracted subflow graph.

19. The method as claimed in claim 17, wherein said analyzing step further includes the step of discovering process boundaries between a process step and its internal and external partners and message interaction therebetween in a business process model and representing the process boundaries and message interactions in an extracted subflow graph.

20. The method as claimed in claim 17, wherein said analyzing step further includes the step of discovering whether a business object defined in said business model representation flows between process steps in said process graph and defining said business object as an adaptive document (ADoc).

21. The method as claimed in claim 20, wherein said analyzing step further includes the step of discovering generic business objects explicitly defined in said business model representation.

22. The method as claimed in claim 21, wherein for each ADoc discovered, the step of generating a macroflow comprising a set of process steps in a subflow graph based upon the information flow of the ADoc in the business process model.

23. The method as claimed in claim 22, wherein said analyzing step further includes the step of identifying said process steps as being collaborations requiring interaction with a human by analyzing role information contained in a business process model.

24. The method as claimed in claim 23, wherein said analyzing step further includes the step of generating screenflows from process steps that have been determined as collaborations and listing the information entities shown by such screenflows derived from the information flows represented in the business process model.

25. The method as claimed in claim 23, wherein said analyzing step further includes the step of establishing an adapter for process steps that interact with external or internal subprocesses represented in the business process model.

26. The method as claimed in claim 22, further comprising the step of mapping each macroflow generated to a BPEL4WS specification.

27. A system for automatically transforming information technology (IT) architecture specifications constrained by a specific IT platform into a platform-independent business model view, said system comprising:
   a computing device programmed for receiving executable IT platform components, said computing device comprising:
   means for automatically developing representations in the form of one or more sub flow graphs according to one of more IT architecture specifications, a said sub flow graph having nodes representing process steps and links depicting a flow of information entities between process step tasks;
   means for automatically analyzing said one or more sub flow graphs and developing representations in the form of a process graph, said means automatically identifying processes comprising discrete process steps that execute specific tasks in the process, and, information entities that are processed by the process steps; and,
   a means for automatically generating a platform-independent business model view from said process graph.

28. The system as claimed in claim 27, wherein said process graph depicts a generalization of the business view model, said analyzing means comprising a model-specific writer associated with a specific business model for automatically mapping elements of said process graph to platform-independent business model elements.

29. The system as claimed in claim 28, further comprising subflow merging means for analyzing at least one sub flow graph and combining them into a process graph representation therefrom capable of being mapped to a specific business view model.

30. The system as claimed in claim 27, wherein said information entities comprise one or more of objects, events and messages, said process graph elements comprising one or more selected from a group comprising: atomic process steps for producing, receiving or modifying one or more information entities; internal or external sub-process steps in accordance with a business process view; control steps that inspect information entities and modify control logic of a process depending upon information content; and information entity flow, including the flow of control or objects or event messages between said process tasks.

31. A method for automatically transforming platform-specific information technology (IT) architecture specifications constrained by a specific IT platform into a platform-independent business model view, said method comprising the steps of:
   a) providing a computing device programmed for receiving executable IT platform components;
   b) automatically developing representations in the form of one or more sub flow graphs according to one of more IT architecture specifications, a said sub flow graph having nodes representing process steps and links depicting a flow of information entities between process step tasks;
   c) automatically analyzing said one or more sub flow graphs and developing representations in the form of a process graph, said means automatically identifying processes comprising discrete process steps that execute specific tasks in the process, and, information entities that are processed by the process steps; and,
   d) automatically generating a platform-independent business model view from said process graph.

32. The method as claimed in claim 31, wherein said process graph depicts a generalization of the business view model, said generating step d) comprising implementing a model-specific writer associated with a specific business model for automatically mapping elements of said process graph to platform-independent business model elements.

33. The method as claimed in claim 32, wherein said analyzing step c) comprises the step of analyzing at least one sub flow graph and combining them into a process graph representation therefrom capable of being mapped to a specific business view model.

34. A computer program device readable by a machine, tangibly embodying a program of instructions executable by a machine to perform method steps for automatically transforming platform-independent business models into executable information technology (IT) architecture specifications constrained by a specific IT platform, said method comprising the steps of:
   a) receiving a machine-readable representation of a business model;
   b) analyzing said specifications to automatically identify processes comprising discrete process steps that execute specific tasks in the process, and, information entities that are processed by the process steps; and,
   c) automatically developing representations in the form of one or more graphs having nodes representing said process steps and links depicting a flow of information entities between process step tasks, and, d) automatically synthesizing executable IT platform components from said developed representations.

35. A computer program device readable by a machine, tangibly embodying a program of instructions executable by a machine to perform method steps for automatically transforming platform-specific information technology (IT) architecture specifications constrained by a specific IT platform into a platform-independent business model view, said method comprising the steps of:

a) receiving executable IT platform components;

b) automatically developing representations in the form of one or more sub flow graphs according to one of more IT architecture specifications, a said sub flow graph having nodes representing process steps and links depicting a flow of information entities between process step tasks;

c) automatically analyzing said one or more sub flow graphs and developing representations in the form of a process graph, said means automatically identifying processes comprising discrete process steps that execute specific tasks in the process, and, information entities that are processed by the process steps; and, d) automatically generating a platform-independent business model view from said process graph.

* * * * *